United States Patent [19]

Baron et al.

[11] Patent Number: 5,145,541
[45] Date of Patent: Sep. 8, 1992

[54] LOW ENERGY CURED COMPOSITE REPAIR SYSTEM BASED ON IMIDAZOLE-BLOCKED NAPHTHYL-DIISOCYANATES

[75] Inventors: Kenneth S. Baron, San Ramon; Susan M. Brinkerhoff, San Lorenzo; Frank W. Lee, San Ramon; Stella M. McKinney, Livermore, all of Calif.

[73] Assignee: Hexcel Corporation, Dublin, Calif.

[21] Appl. No.: 714,827

[22] Filed: Jun. 13, 1991

Related U.S. Application Data

[62] Division of Ser. No. 377,087, Jul. 7, 1989, Pat. No. 5,086,149.

[51] Int. Cl.$^5$ ............................................. B32B 35/00
[52] U.S. Cl. .................................... 156/98; 156/285; 156/307.3; 156/323; 156/330; 427/140; 427/196; 427/208.2; 427/386
[58] Field of Search ............... 156/98, 285, 307.3, 156/323, 330; 427/140, 196, 208.2, 386

[56] References Cited

U.S. PATENT DOCUMENTS

| | | | |
|---|---|---|---|
| 4,293,561 | 10/1981 | Walker | 548/341 |
| 4,335,228 | 6/1982 | Beitchman et al. | 528/117 |
| 4,358,571 | 11/1982 | Kaufman et al. | 528/117 |
| 4,533,715 | 8/1985 | Lee et al. | 528/45 |

Primary Examiner—John C. Bleutge
Assistant Examiner—Frederick Krass
Attorney, Agent, or Firm—Oblon, Spivak, McClelland, Maier & Neustadt

[57] ABSTRACT

A fiber reinforced resin matrix composite material repair system is provided, which critically employs a resin comprising a catalyst of the formula I:

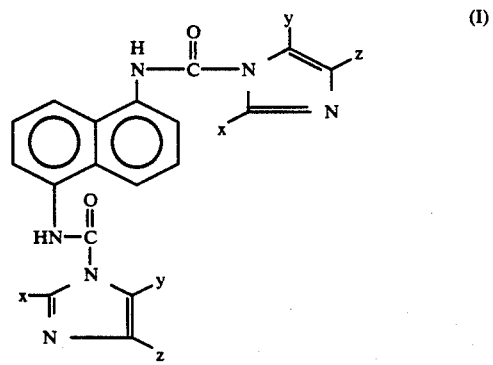

with a multifunctional epoxy resin, the resin system being sealed in a water-proofed environment prior to being coated onto a fiber reinforcement. The coated fiber reinforcement is applied over the damaged area, the damaged portion having been removed, and the surrounding surface smoothed. An adhesive is applied to the remaining surface, prior to application of the patch. The resulting patch, which may further include thermoplastic toughening agents and an enhancer, can be directly cured at temperatures below 212° F. to give physical properties similar to the original material.

4 Claims, No Drawings

LOW ENERGY CURED COMPOSITE REPAIR SYSTEM BASED ON IMIDAZOLE-BLOCKED NAPHTHYL-DIISOCYANATES

This is a division of application Ser. No. 07/377,087 now U.S. Pat. No. 5,086,149, filed on Jul. 7, 1989.

BACKGROUND OF THE INVENTION

1. Field of the Invention

This invention pertains to the art of fiber reinforced resin matrix composites, generally of oriented fiber reinforcement. More specifically, a composite material repair system, and method of effecting field repairs, is disclosed.

2. Background of the Invention

Fiber reinforced resin matrix composite materials have found increasing application in fields where high strength and weight savings are twin concerns. Thus, increasingly, aircraft, missiles, spacecraft and support vehicles exhibit a significant percentage of these composite materials in structural or critical elements, such as fuselage structures, as well as non-critical features such as seating and cabin apparatus. These applications, particularly the adoption of composite material in military applications, has created a pressing need for a method of repairing damage to composite materials outside of sophisticated factories and laboratories; in particular, a need to provide a method for on-site repairs at air fields, depots and the like is presented. Current trends indicate that such repair capabilities will be essential to maintain an operative aerospace system in the future.

Any composite material on-site repair system must meet several objectives. Whatever materials are employed in the repair system must have a relatively long shelf life at ambient conditions. Sophisticated refrigeration and low pressure containment systems will not be available for field repairs and are not likely to be available at remote depots. Such apparatus is also susceptible to interruption, which would threaten the integrity of any repair system requiring such apparatus. Repeated destruction and reacquisition of relatively short shelf life products is expensive and impractical.

The repair system must be capable of being cured at relatively low temperatures, very rapidly, without the need for extensive design of repair parts. Generally, necessary temperatures must be below the boiling point of water, 212° F. By the same token, the equipment used in effecting repairs must be relatively unsophisticated. In most cases, nothing more than a vacuum bag and heating blanket would be available.

The repaired structure must exhibit performance properties such as tensile strength, impact resistance, shear modulus, etc. on a par with the original materials to which they are mated, to preserve integrity of the repaired article. Generally, the original materials will be special factory preparations, involving the use of sophisticated resin blends and curing profiles, including cure temperatures of 350° F. and more for conventional epoxy systems.

The repair system must also be susceptible of easy and rapid use by relatively unsophisticated personnel. Component mixing, sophisticated application procedures and the like, which may be acceptable in factories devoted to the manufacture of high cost articles, will not be practical.

The repair systems currently available generally fall under two classes, neither of which satisfactorily meets the above objectives. The bolting or mechanical fastening of metal or cured composite material patches over the damaged area is impractical and does not yield satisfactory results. This process can frequently be difficult or impossible on-site due to lack of backside access, and the use of blind fasteners and drilling operations induce added stresses and possible areas of failure to the repair site.

The alternative conventional system involves the use of a wet lay-up procedure. This employs, as a patching material, a two part system that must be mixed prior to repair and used immediately. While the wet lay-up system does offer long term shelf life, and simply cure profiles, the control of material mixing, resin to fiber ratio and wet out of fiber frustrates attempts to reliably, achieve the desired properties. This system also involves an increased exposure of workers to hazardous and irritating chemicals, including amines and epoxy components. Further, due to the need to mix the two components of the system, there is a high potential for error during compounding, with the resulting risk of an exothermic reaction, especially when large batches are required.

Accordingly, it remains a pressing need of the industry to provide a resin matrix fiber reinforced composite material repair system, meeting all of the above objectives.

SUMMARY OF THE INVENTION

The composite repair system of the invention relies on the discovery that the epoxy resin system of U.S. Pat. No. 4,533,715, including the imidazole blocked naphthyl diisocyanate catalyst disclosed therein exhibits superior ambient shelf life, given the rigid exclusion of moisture, for a period in excess of one year. An epoxy resin system incorporating the catalyst structure, and optionally thermoplastic toughening agents to improve physical properties, can be cured at extremely low temperatures, below 212° F., using simple technology, to achieve repair parts having physical properties equal to the original, undamaged article. The entire disclosure of U.S. Pat. No. 4,533,715 is incorporated herein by reference.

To repair a damaged portion of fiber reinforced resin matrix composite materials, the damaged portion is excised from the structure involved, and the surrounding portion of the structure is smoothed out, to avoid the presence of rough edges that might otherwise interfere with adhesion of the repair patch. A patch of oreinted fiber material impregnated with the resin system of the invention is applied over the portion of the structure corresponding to the excised damaged material. A means for applying pressure, and temperature, such as a vacuum bag and heating blanket, are applied over the patch, and the heat elevated to the cure temperature, below the boiling point of water, for a time sufficient to cure the resin system. This time period is generally on the order of a few hours.

DETAILED DESCRIPTION OF THE INVENTION

As noted, the resin matrix fiber reinforced composite repair system of this invention employs, as a critical catalyst, the catalyst of U.S. Pat. No. 4,533,715, represented as Formula I.

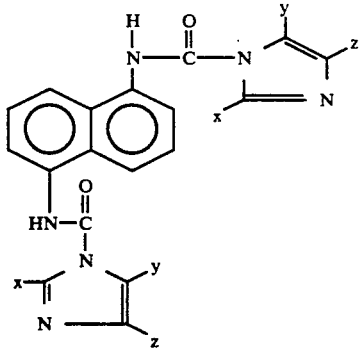

(I)

wherein x, y and z may be the same or different, and each may be hydrogen, a lower alkyl or aryl of $C_{1-12}$, halo or nitro. The curing agent or catalyst may be incorporated in amounts ranging from 5-15 pph. preferably 6-8 pph, in an epoxy resin which may consist of one or more multifunctional epoxy resins.

It has been discovered that these one component epoxy resins, when stored at room temperatures below 90° F., and given the rigid exclusion of moisture, exhibit enhanced shelf life, over a period well in excess of one year. It is believed that under appropriate conditions periods of two years of shelf life may be possible, with adequate properties upon activation.

To provide the one component epoxy system, the epoxy resin may be selected from virtually any multifunctional epoxy resin, depending on the ultimate physical and curing properties required. Thus, epoxy resins such as MY721 and 0510 from Ciba Geigy and Tactix 742 sold by Dow Chemical, may be formulated together, together with the catalyst at a range of about 6-8 pph. Alternative resin candidates include the Shell Chemical resin series 1071 et. seq., specifically 1071, 1072, 1079 as well as 1031, or other bisphenol A or bisphenol F epoxy resins.

The resin/catalyst system may be placed in aluminum packaging, which is heat sealed in a dry box, which excludes water to a level less than 80 ppm water. The prepreg is placed into the chamber and allowed to reach equilibrium for 24 hours. The prepreg is then sealed inside the chamber using aluminum barrier bags which are heat sealable. Dried desiccant bags are placed inside the packaging material prior to sealing.

Alternatively, the material may be protected from moisture through purge and vacuum packaging. The purge and vacuum packaging is performed by placing dried desiccant bags and the prepreg into aluminum barrier bags. The bags are then heat sealed except for a small opening approximately ¼ inch in size at one corner of the bag. A hose with a tapered fitting is placed into the hole and vacuum is drawn until the bag is collapsed and is tightly fitted to the prepreg core. The vacuum is removed and prepurified nitrogen is allowed to purge into the bag. When the bag is completely filled with nitrogen, the vacuum hose is refitted into the hole and vacuum is drawn until the bag is once more collapsed. When the bag is tightly fitted to the prepreg core the ¼ inch hole is heat sealed. Of course, alternative heat-sealable materials, such as multi-layered mylar, polyethylene, etc. may be used. When coated onto an oriented fiber reinforcement, and heated above 160° F., the reaction rate of the resin formulations is nearly instantaneous. Possibly as a result, the cured systems exhibit modulus and dimensional stability characteristics that parallel those of the original material, cured at temperatures of 350° F. and above.

To further improve the properties obtained, a thermoplastic additive may be introduced, such as polyether sulphones, polysulphones, polyamideimides or polyimides. The addition of these toughening agents, in a range of about 0.1-25 wt. %, preferably 0.1-5%, improves physical properties, particularly reducing brittleness, while not adversely effecting the Tg of the system, as conventional additives are likely to do.

To further improve the performance of the toughening agents, a toughening agent enhancer may be added to the resin formulation. In particular, a Polyester rubber resin, such as VITEL, produced by Goodyear, a polymer of 1,4benzenedicarboxylate, nonanedioic acid, 1,3-benzenedicarboxylic acid, 2,2-dimethyl-1,3-propanediol and 1,2-ethanediol, having an empirical formula:

(C10 H10 O4.C9 H16 O4.C8 H6 O4.C5 H12 O2.C2 H6 O2)x, appears to enhance the improvement of physical properties achieved by the addition of thermoplastic toughening agents. On a weight percentage, an addition of about 0.5%-5% polyester rubber resin achieves a significant increase in the reduction of brittleness achieved by the addition of the thermoplastic toughening agent. A particularly preferred range of enhancer addition is about 0.5-3% by weight. While additions of the polyester rubber resin enhancing agent beyond about 5% do not appear to be disadvantageous, no increased enhancement of the toughening effect of the thermoplastic additive is observed.

A structure having damage in a fiber reinforced resin matrix composite material is repaired by first excising the damaged portion. The area surrounding the damaged portion is smoothed, e.g., sanded, to remove rough edges and surfaces that might otherwise interfere with bonding of the repair portion. A repair patch is prepared, by impregnating a fiber reinforcement, such as unidirectional graphite fabric plys incorporated into a laminate having multiple orientations, by conventional technologies. For on-site repairs, hot melt impregnation is preferred. An epoxy adhesive is applied to the surface surrounding the excised damaged portion, and the repair patch is applied thereover. A release film is applied over the wet patch, and conventional means for applying pressure and heat are subsequently applied. A particularly preferred embodiment, because of its simplicity, involves the application of a vacuum bag and heating blanket. Resin bleeders may be employed, where necessary.

Under applied vacuum (e.g., 15 psi max) the cure temperature may be reached directly, without an involved cure profile or cycle. A heating period of 2-3 hours at 200° F. is sufficient to reach a cure state where tensile compression, short beam shear and flexural tests give values equivalent to the original epoxy resin composite, cured at temperatures of 350° F. and above. Indeed, in many cases, the performance is actually superior to the same resin system, cured through conventional techniques using other catalyst systems.

Obviously, numerous modifications and variations of the present invention are possible in light of the above teachings. It is therefore to be understood that within the scope of the appended claims, the invention may be

What is claimed is:

1. A method of making on-site repairs of a structure comprised of oriented fiber/resin matrix composite material, which material has been damaged, said method comprising:

a) removing the damaged portion from said structure, b) smoothing those portions of said structure surrounding said excised damaged portion which exhibit rough edges, and applying an epoxy adhesive thereto, c) applying a patch of epoxy resin system impregnated fiber material over that portion of said structure previously occupied by said damaged portion and adhering it to said smooth edges, the resin system having a shelf life in excess of one year, and comprising at least one multifunctional epoxy resin and a catalyst of the formula:

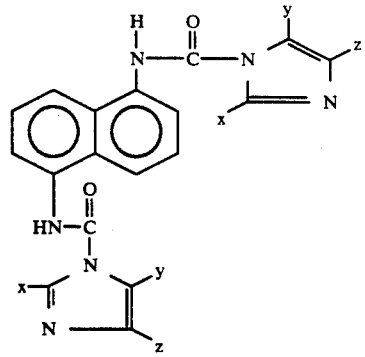

wherein x, y, and z may be the same or different, and each may be hydrogen, a lower alkyl or aryl of $C_{1-12}$, halo or nitro, in an amount of 5-15 pph, d) applying pressure to said patch to adhere it to said structure and heating said patch to a temperature not more than the boiling point of water for a time sufficient to cure said resin system.

2. The process of claim 1, wherein said resin system further comprises a thermoplastic toughening agent in an amount of 0.1-25% by weight.

3. The process of claim 2, wherein said resin system further comprises a thermoplastic toughening agent enhancer comprised of a polyester rubber resin, in an amount of 0.5-5%, by weight.

4. The process of claim 1, wherein said patch under pressure is heated directly to a temperature of about 170° F.-200° F., for a period of 2-3 hours.

* * * * *